US012633260B2

(12) United States Patent
Lee

(10) Patent No.: US 12,633,260 B2
(45) Date of Patent: May 19, 2026

(54) DISPLAY DEVICE AND DRIVING METHOD OF THE SAME

(71) Applicant: LG Display Co., Ltd., Seoul (KR)

(72) Inventor: Cheol Su Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/945,951

(22) Filed: Nov. 13, 2024

(65) Prior Publication Data

US 2025/0239221 A1 Jul. 24, 2025

(30) Foreign Application Priority Data

Jan. 22, 2024 (KR) ........................ 10-2024-0009599

(51) Int. Cl.
*G09G 3/3233* (2016.01)

(52) U.S. Cl.
CPC ... *G09G 3/3233* (2013.01); *G09G 2300/0842* (2013.01); *G09G 2310/08* (2013.01); *G09G 2320/045* (2013.01)

(58) Field of Classification Search
None
See application file for complete search history.

(56) References Cited

U.S. PATENT DOCUMENTS

2017/0162119 A1* 6/2017 Kim ..................... G09G 3/3258
2019/0081261 A1* 3/2019 Lee ...................... H10H 20/813
2020/0043421 A1* 2/2020 Kang .................. G09G 3/3275

FOREIGN PATENT DOCUMENTS

KR 20190053688 A 5/2019

* cited by examiner

*Primary Examiner* — Matthew Yeung
(74) *Attorney, Agent, or Firm* — Seed Intellectual Property Law Group LLP

(57) ABSTRACT

Disclosed is a display device including a subpixel including a light emitting element, a reference line connected to the subpixel, a power supply configured to provide a path for transmitting a voltage present at a cathode of the light emitting element to the reference line, and a sensing circuit configured to sense a voltage present on the reference line.

9 Claims, 18 Drawing Sheets

DISPLAY DEVICE AND DRIVING METHOD OF THE SAME

CROSS-REFERENCE TO RELATED APPLICATION(S)

This application claims the benefit of Korean Patent Application No. 10-2024-0009599, filed on Jan. 22, 2024, which is hereby incorporated by reference as if fully set forth herein.

BACKGROUND

Technical Field

The present disclosure relates to a display device and a method of driving the same.

Description of the Related Art

As information technology develops, the market for display devices, which are communication media between users and information, is growing. Accordingly, display devices such as a light emitting display (LED) device, a quantum dot display (QDD) device, and a liquid crystal display (LCD) device are increasingly used.

The display devices described above include a display panel including subpixels, a driver outputting driving signals for driving the display panel, and a power supply for generating power to be supplied to the display panel or the driver.

In such display devices, when driving signals, for example, a scan signal and a data signal, are supplied to subpixels formed in a display panel, selected subpixels transmit light or directly emit light, thereby displaying an image.

BRIEF SUMMARY

The present disclosure is directed to a display device and a method of driving the same that, among others, substantially obviate one or more problems due to limitations and disadvantages of the related art.

The present disclosure senses a threshold voltage of an organic light emitting diode from a specific subpixel to determine whether or not the organic light emitting diode has deteriorated, compensate for the deterioration to improve display quality, and achieve a long lifespan. In addition, the present disclosure makes it possible to construct a lookup table that can improve the reliability of a light emitting display device on the basis of a sensing technique by which a correct degree of deterioration can be ascertained for each color of a subpixel.

Additional technical characteristics, and features of the present disclosure will be set forth in part in the description which follows and in part will become apparent to those having ordinary skill in the art upon examination of the following or may be learned from practice of the present disclosure. The features and other improvements of the present disclosure may be realized and attained by the structure pointed out in the written description and claims hereof as well as the appended drawings.

To achieve these features and other improvements and in accordance with the purpose of the present disclosure, as embodied and broadly described herein, a display device includes a subpixel including a light emitting element, a reference line connected to the subpixel, a power supply configured to provide a path for transmitting a voltage present at a cathode of the light emitting element to the reference line, and a sensing circuit configured to sense a voltage present on the reference line.

The power supply may include a power control transistor for blocking low-voltage power applied to the cathode of the light emitting element when the voltage at the cathode of the light emitting element is transmitted to the reference line.

The power supply may include an activation switch turned on when the voltage at the cathode of the light emitting element is transmitted to the reference line.

The power control transistor may be disposed between an output terminal of the power supply and a low-voltage power line of the display panel, and the activation switch may be included in the power supply and disposed between a circuit connected to the cathode of the light emitting element and a circuit connected to the reference line.

In another aspect of the present disclosure, a method of driving a display device includes a first step of applying a scan signal of an on-voltage to a gate line of a subpixel included in a display panel, applying a sensing data voltage to a data line of the subpixel, applying a reference voltage to a reference line of the subpixel, and applying power to a power line of the subpixel, a second step of applying a scan signal of an off-voltage to the gate line of the subpixel, floating the data line of the subpixel, blocking the reference voltage applied to the reference line of the subpixel, blocking low-voltage power applied to a power line connected to a cathode of the subpixel, and transmitting a voltage present at the cathode of the subpixel to the reference line of the subpixel, and a third step of generating a compensation value according to whether or not the light emitting element has deteriorated by sensing the voltage transmitted to the reference line of the subpixel.

The first step may include selectively outputting a scan signal applied to a gate line of the display panel and a sensing data voltage applied to a data line of the display panel to enable sensing for each area or block of the display panel.

In another aspect of the present disclosure, a display device includes a subpixel including a light emitting element, a reference line connected to the subpixel, a power supply configured to sense a voltage at a cathode of the light emitting element and providing a sensing value, and a controller configured to generate a compensation value according to whether or not the light emitting element has deteriorated on the basis of the sensing value transmitted from the power supply.

The power supply may include a power control transistor for blocking low-voltage power applied to the cathode of the light emitting element when sensing the voltage at the cathode of the light emitting element.

The power control transistor may be disposed between an output terminal of the power supply and a low-voltage power line of the display panel.

In another aspect of the present disclosure, a method of driving a display device includes a first step of applying a scan signal of an on-voltage to a gate line of a subpixel included in a display panel, applying a sensing data voltage to a data line of the subpixel, applying a reference voltage to a reference line of the subpixel, and applying power to a power line of the subpixel, a second step of applying a scan signal of an off-voltage to the gate line of the subpixel, floating the data line of the subpixel, blocking the reference voltage applied to the reference line of the subpixel, blocking low-voltage power applied to a power line connected to a cathode of the subpixel, and sensing a voltage present at the cathode of the subpixel using a circuit included in a power supply, and a third step of generating a compensation value according to whether or not the light emitting element has deteriorated on the basis of the voltage transmitted from the circuit included in the power supply.

The first step may include selectively outputting a scan signal applied to a gate line of the display panel and a sensing data voltage applied to a data line of the display panel to enable sensing for each area or block of the display panel.

It is to be understood that both the foregoing general description and the following detailed description of the present disclosure are exemplary and explanatory and are intended to provide further explanation of the present disclosure.

BRIEF DESCRIPTION OF THE SEVERAL VIEWS OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION

A display device according to the present disclosure may be implemented as a television system, an image player, a personal computer (PC), a home theater, an automobile electric device, a smartphone, or the like, but is not limited thereto. The display device according to the present disclosure may be implemented as a light emitting display (LED) device, a quantum dot display (QDD) device, a liquid crystal display (LCD) device, or the like. However, for convenience of description, as an example, a light emitting display device that directly emits light based on inorganic light emitting diodes or organic light emitting diodes will be described below.

Figure 1:
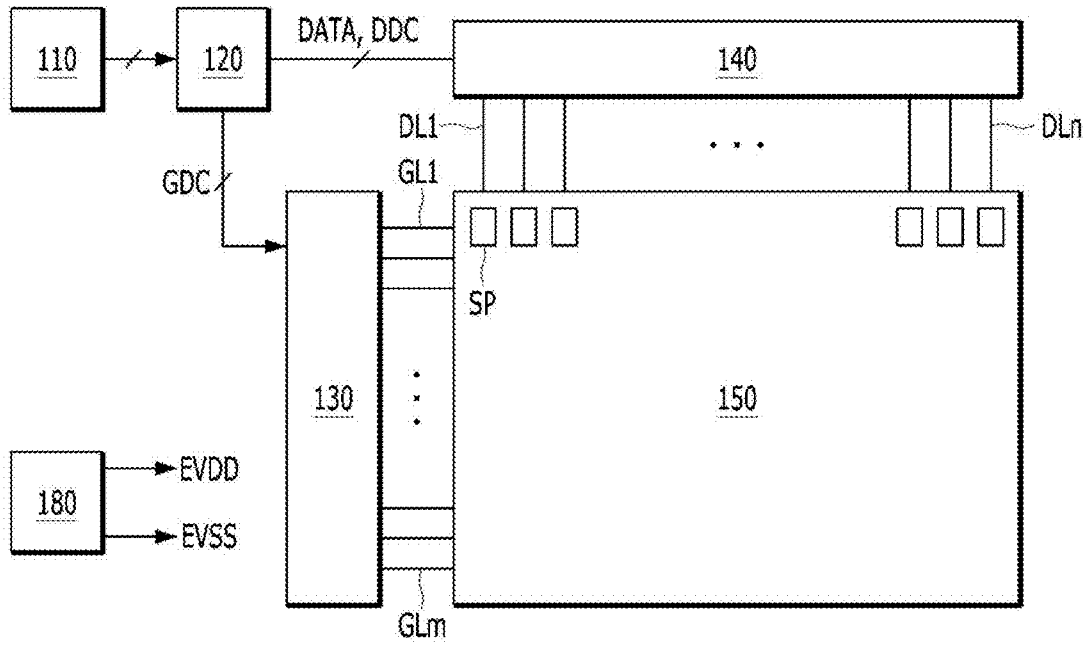
FIG. 1 is a block diagram schematically showing a light emitting display device.
Figure 2:
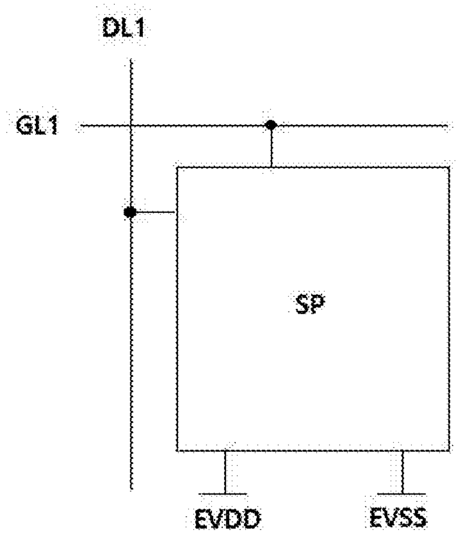
FIG. 2 is a configuration diagram schematically showing a subpixel shown in FIG. 1.
Figure 3:
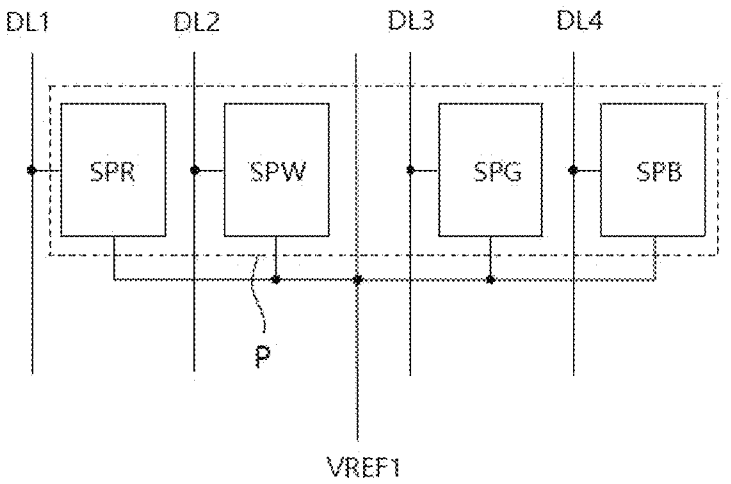
FIG. 3 is a diagram illustrating a pixel composed of subpixels.

FIG. 1 is a block diagram schematically showing a light emitting display device, FIG. 2 is a configuration diagram schematically showing a subpixel shown in FIG. 1, and FIG. 3 is a diagram showing a pixel composed of subpixels.

As illustrated in FIG. 1, FIG. 2, and FIG. 3, the light emitting display device may include a timing controller 120, a gate driver 130, a data driver 140, a display panel 150, a power supply 180, and the like.

An image provider 110 (a set or a host system) may output various driving signals along with an externally supplied image data signal or an image data signal stored in an internal memory. The image provider 110 may supply data signals and various driving signals to the timing controller 120.

The timing controller 120 may output a gate timing control signal GDC for controlling the operation timing of the gate driver 130, a data timing control signal DDC for controlling the operation timing of the data driver 140, and various synchronization signals. The timing controller 120 may supply a data signal DATA supplied from the image provider 110 to the data driver 140 along with the data timing control signal DDC. The timing controller 120 may be implemented in the form of an integrated circuit (IC) and mounted on a printed circuit board, but is not limited thereto.

The gate driver 130 may output a gate signal (or a gate voltage) in response to the gate timing control signal GDC supplied from the timing controller 120. The gate driver 130 may supply gate signals to subpixels included in the display panel 150 through gate lines GL1 to GLm. The gate driver 130 may be implemented in the form of an IC or directly formed on the display panel 150 in a gate-in-panel structure, but is not limited thereto.

The data driver 140 may sample and latch the data signal DATA in response to the data timing control signal DDC supplied from the timing controller 120, convert the digital data signal into an analog data voltage on the basis of a gamma reference voltage, and output the analog data voltage. The data driver 140 may supply data voltages to the subpixels included in the display panel 150 through data lines DL1 to DLn. The data driver 140 may be implemented in the form of an integrated circuit (IC) and mounted on the display panel 150 or mounted on a printed circuit board, but is not limited thereto.

The power supply 180 can generate first power at a high level and second power at a low level on the basis of an external input voltage supplied from the outside. The power supply 180 may output the first power through a first power line EVDD and output the second power through a second power line EVSS. The power supply 180 may generate and output voltages (e.g., a scan high voltage and a scan low voltage) necessary to drive the gate driver 130 and voltages (e.g., a drain voltage and a half drain voltage) necessary to drive the data driver 140 as well as the first power and the second power.

The display panel 150 may display an image in response to driving signals including a scan signal and a data voltage, the first power, and the second power. The subpixels of the display panel 150 may directly emit light. The display panel 150 may be manufactured based on a substrate having rigidity or flexibility, such as glass, silicon, polyimide, or the like. For example, one subpixel SP may be connected to the first data line DL1, the first gate line GL1, the first power line EVDD, and the second power line EVSS and may include a pixel circuit including a switching transistor, a driving transistor, a capacitor, an organic light emitting diode, etc.

Subpixels SP used in the light-emitting display device directly emit light, and thus the circuit configuration thereof is complicated. In addition, there are various compensation circuits that compensate for deterioration (in the threshold voltage, mobility, etc.) of not only the organic light emitting diode emitting light but also the driving transistor that supplies a driving current necessary to drive the organic light emitting diode. Therefore, the subpixel SP is simply shown in the form of a block.

Subpixels emitting light may be composed of red, green, and blue pixels or red, green, blue, and white pixels. For example, one pixel P may include a red subpixel SPR connected to the first data line DL1, a white subpixel SPW connected to the second data line DL2, a green subpixel SPG connected to the third data line DL3, and a blue subpixel SPB connected to the fourth data line DL4. Additionally, the red subpixel SPR, white subpixel SPW, green subpixel SPG, and blue subpixel SPB may be commonly connected to a first reference line VREF1. The first reference line VREF1 may be used to sense deterioration of elements included in one of the red subpixel SPR, white subpixel SPW, green subpixel SPG, and blue subpixel SPB, which will be described below.

Meanwhile, the timing controller 120, the gate driver 130, and the data driver 140 have been described as individual components. However, depending on the implementation method of the light emitting display device, one or more of the timing controller 120, the gate driver 130, and the data driver 140 may be integrated into a single IC. In addition, the timing controller 120, the gate driver 130, the data driver 140, the power supply 180, and the display panel 150 are an assembly for displaying images and may be defined as a display module.

In addition, as an example, the pixels P in which the red subpixel SPR, white subpixel SPW, green subpixel SPG, and blue subpixel SPB are arranged in order has been illustrated. However, the arrangement order and direction of subpixels may vary depending on the implementation method of the light emitting display device.

Figure 4:
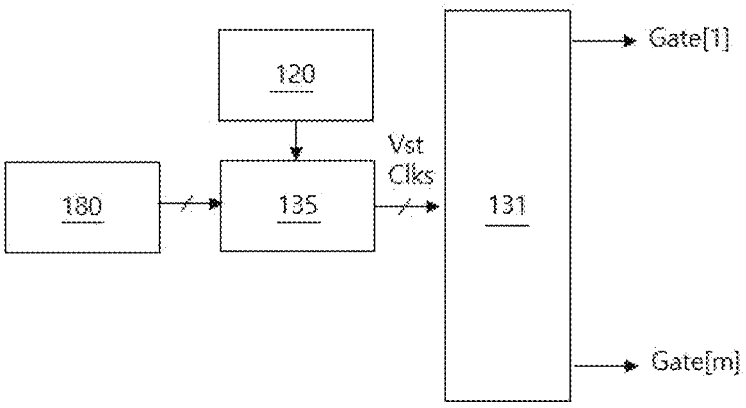
FIG. 4 and FIG. 5 are diagrams illustrating the configuration of a gate-in-panel type gate driver.
Figure 5:
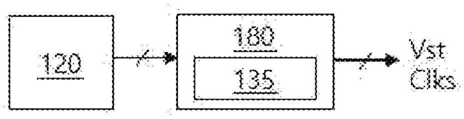
Figure 6:
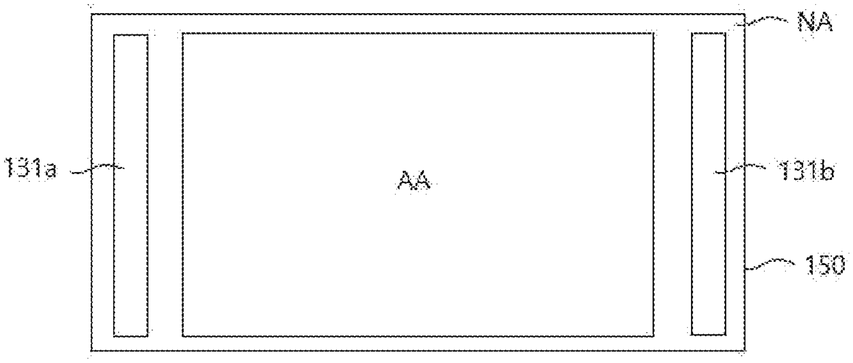
FIG. 6 is a diagram showing an example of the arrangement of the gate-in-panel type gate driver.

FIG. 4 and FIG. 5 are diagrams illustrating the configuration of a gate-in-panel type gate driver, and FIG. 6 is a diagram showing an example of the arrangement of the gate-in-panel type gate driver.

As shown in FIG. 4, the gate-in-panel type gate driver may include a shift register 131 and a level shifter 135. The level shifter 135 may generate driving clock signals Clks and a start signal Vst on the basis of signals and voltages output from the timing controller 120 and the power supply 180.

The shift register 131 operates on the basis of signals Clks and Vst output from the level shifter 135, and may output gate signals Gate[1] to Gate[m] for turning on or off transistors formed in the display panel. The shift register 131 may take the form of a thin film on the display panel in a gate-in-panel structure.

As shown in FIG. 4 and FIG. 5, unlike the shift register 131, the level shifter 135 may be formed independently in the form of an IC or may be included in the power supply 180. However, this is merely an example and is not limited to thereto.

As shown in FIG. 6, shift registers 131*a* and 131*b* that output gate signals in the gate-in-panel type gate driver may be disposed in a non-display area NA of the display panel 150. As an example, the shift registers 131*a* and 131*b* are disposed in the left and right non-display areas NA of the display panel 150, but the shift registers 131*a* and 131*b* may also be disposed in upper and lower non-display areas NA of the display panel 150 or may be disposed within a display area AA of the display panel 150.

Figure 7:
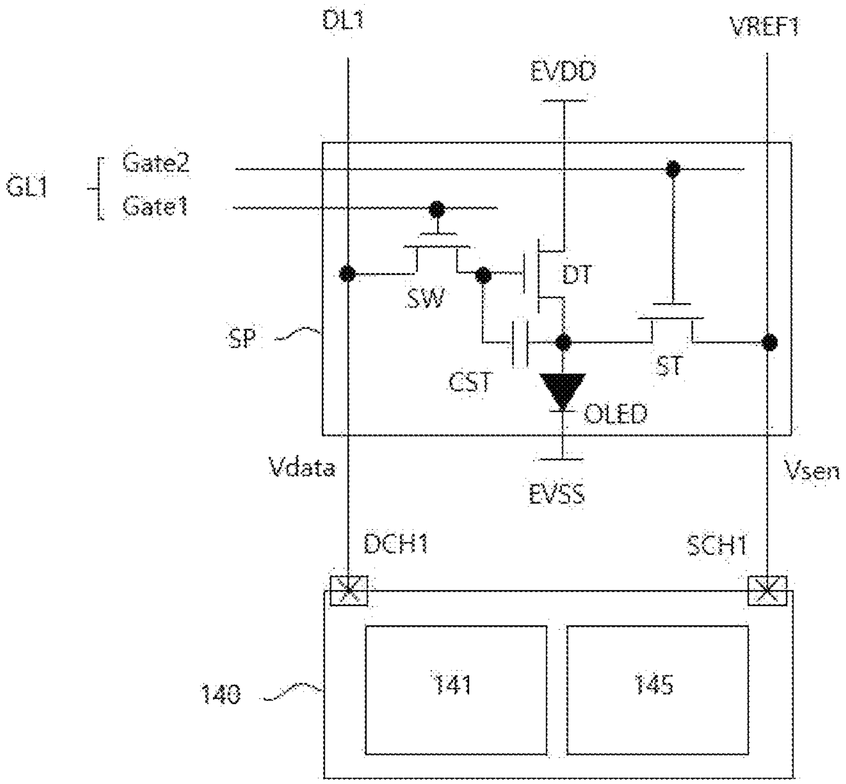
FIG. 7 is a diagram schematically showing a subpixel and a data driver according to a first example of an embodiment.
Figure 8:
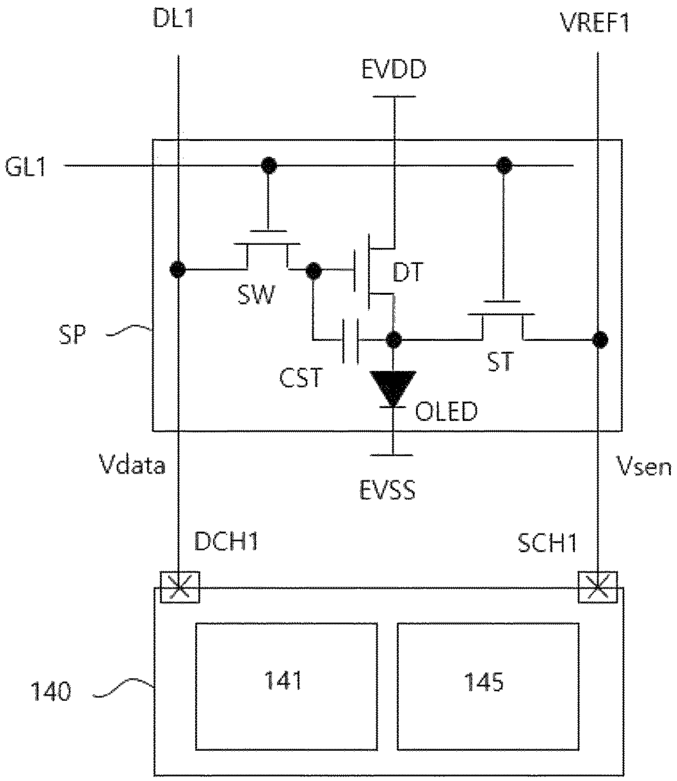
FIG. 8 is a diagram schematically showing a subpixel and a data driver according to a second example of the embodiment.
Figure 9:
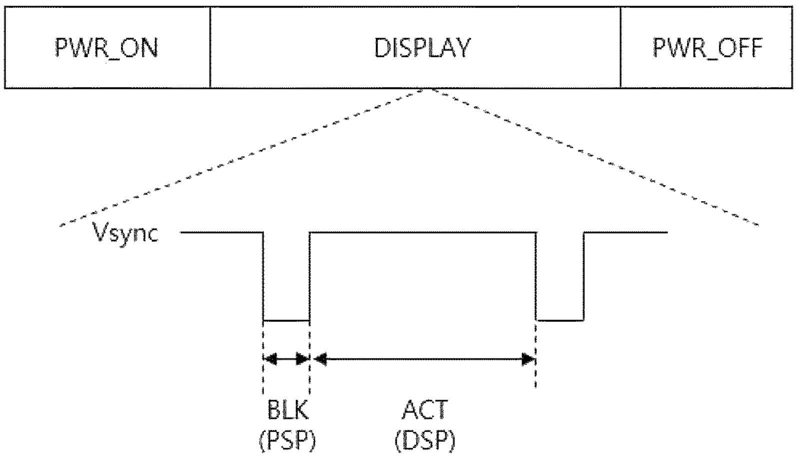
FIG. 9 is a waveform diagram illustrating a sensing period and a display period according to the embodiment.

FIG. 7 is a diagram schematically showing a subpixel and a data driver according to a first example of an embodiment, FIG. 8 is a diagram schematically showing a subpixel and a data driver according to a second example of the embodiment, and FIG. 9 is a waveform diagram illustrating a sensing period and a display period.

As shown in FIG. 7, according to the first example, one subpixel SP may include a switching transistor SW, a driving transistor DT, a sensing transistor ST, a capacitor CST, and an organic light emitting diode OLED (light emitting element).

The driving transistor DT may include a gate electrode connected to a first electrode of the capacitor CST, a first electrode connected to the first power line EVDD, and a second electrode connected to the anode of the organic light emitting diode OLED. The capacitor CST may have the first electrode connected to the gate electrode of the driving transistor DT and a second electrode connected to the anode electrode of the organic light emitting diode OLED. The organic light emitting diode OLED may have the anode connected to the second electrode of the driving transistor DT and a cathode connected to the second power line EVSS.

The switching transistor SW may include a gate electrode connected to a first scan line Gate1 included in the first gate line GL1, a first electrode connected to the first data line DL1, and a second electrode connected to the gate electrode of the driving transistor DT. The sensing transistor ST may include a gate electrode connected to a second scan line Gate2 included in the first gate line GL1, a first electrode connected to the first reference line VREF1, and a second electrode connected to the anode of the organic light emitting diode OLED.

The sensing transistor ST is a kind of compensation circuit added to compensate for deterioration (threshold voltage, mobility, etc.) of the driving transistor DT or the organic light emitting diode OLED. The sensing transistor ST can enable physical threshold voltage sensing based on the source follower operation of the driving transistor DT. The sensing transistor ST can operate to acquire a sensing voltage Vsen through a sensing node defined between the driving transistor DT and the organic light emitting diode OLED.

According to an embodiment, the data driver 140 may include a driving circuit 141 for driving the subpixel SP and a sensing circuit 145 for sensing the subpixel SP. The driving circuit 141 may be connected to the first data line DL1 through a first data channel DCH1. The driving circuit 141 may output a data voltage Vdata for driving the subpixel SP through the first data channel DCH1.

The sensing circuit 145 may be connected to the first reference line VREF1 through a first sensing channel SCH1. The sensing circuit 145 may acquire a sensing voltage Vsen sensed from the subpixel SP through the first sensing channel SCH1. The sensing circuit 145 may acquire the sensing voltage Vsen based on a current sensing or voltage sensing method.

As shown in FIG. 8, according to the second example, the first gate line GL1 may be integrated into one. That is, unlike the first example, the first gate line GL1 may not be divided into the first scan line and the second scan line. In this case, the switching transistor SW and the sensing transistor ST are commonly connected to the first gate line GL1, and thus can be turned on or off at the same time. Hereinafter, as an example, a subpixel according to a second example will be described.

As shown in FIG. 9, the light emitting display device according to the embodiment may adopt driving modes respectively corresponding to a first driving period PWR_ON, a second driving period DISPLAY, and a third driving period PWR_OFF when operating to drive the display panel.

The first driving period PWR_ON may correspond to a driving start period in which power is applied to the display panel, the second driving period DISPLAY may correspond to a panel driving period in which operation such as displaying an image is performed after the power is applied to the display panel, and a third driving period PWR_OFF may correspond to a driving end period in which the power applied to the display panel is cut off. Meanwhile, the third driving period PWR_OFF is a period in which the display panel is driven for a certain period of time while displaying black such that the sensing operation of the display panel can be performed. That is, note that the power applied to the display panel and the like is not completely cut off during the third driving period PWR_OFF.

The light emitting display device according to the embodiment may sense the display panel in at least one of the first drive period PWR_ON, the second drive period DISPLAY, and the third drive period PWR_OFF. As an example, in the second driving period DISPLAY, a blank period BLK included in the vertical synchronization signal Vsync may be defined as a sensing period PSP, and an active period ACT included in the vertical synchronization signal Vsync may be defined as a display period DSP.

Figure 10:
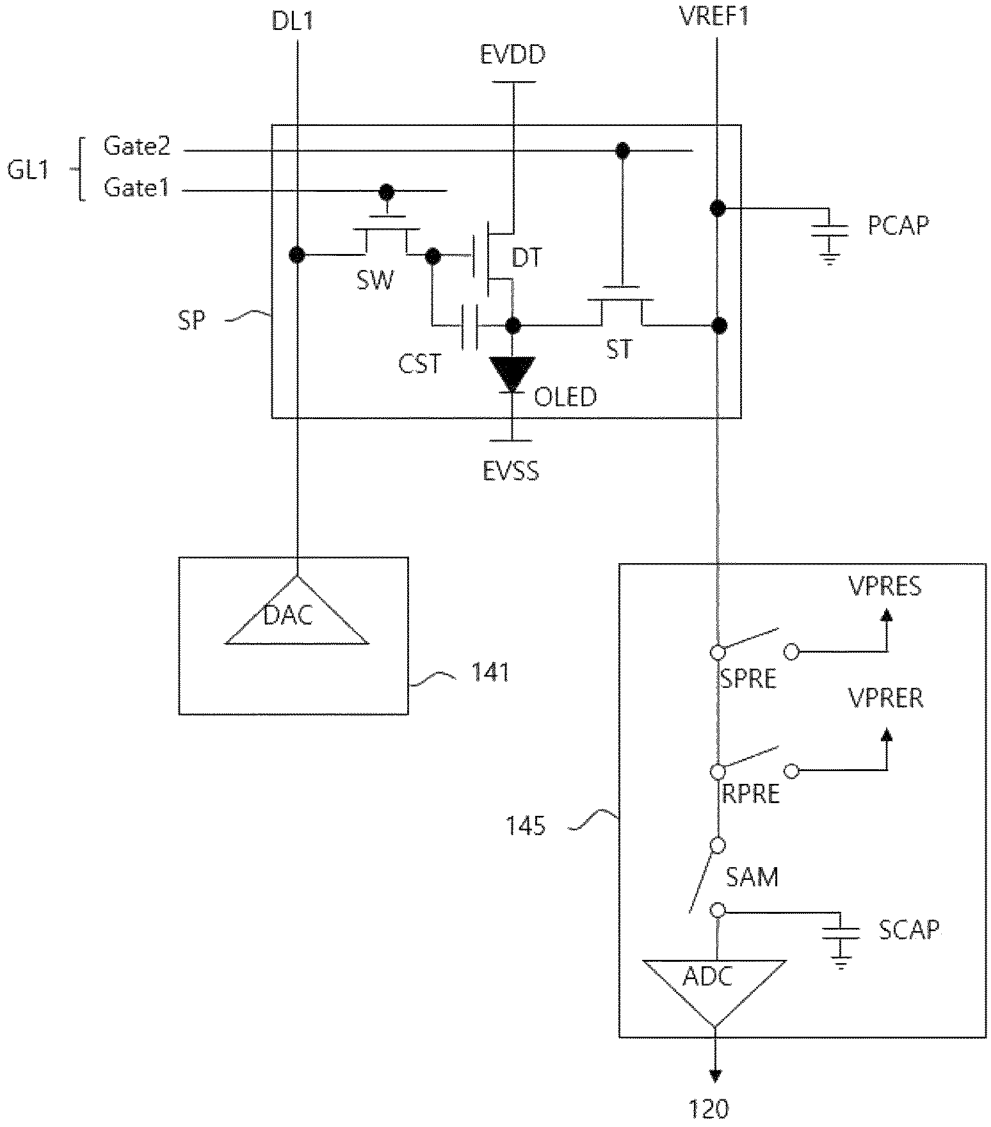
FIG. 10 is a diagram showing some of components included in the data driver according to the embodiment in more detail.
Figure 11:
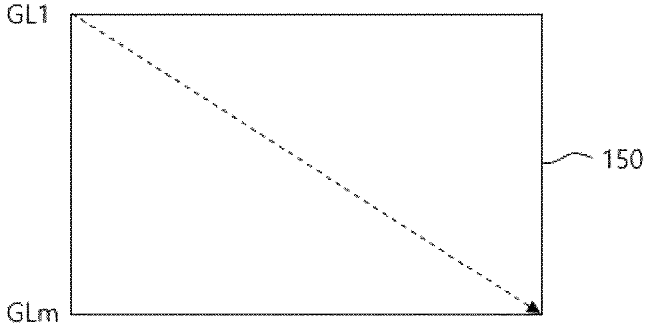
FIG. 11 and FIG. 12 are diagrams showing a method of sensing a display panel according to the embodiment.
Figure 12:
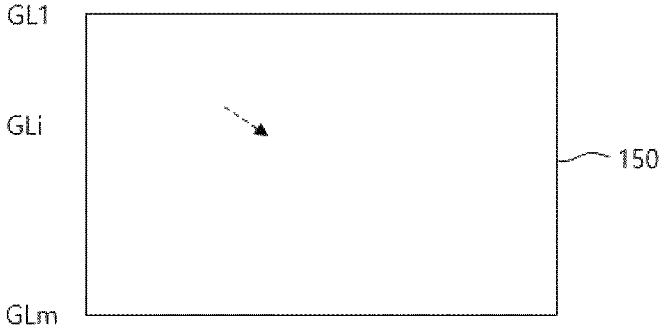

FIG. 10 is a diagram showing some of the components included in the data driver according to an embodiment in more detail, and FIG. 11 and FIG. 12 are diagrams showing a method of sensing the display panel according to the embodiment. Hereinafter, as an example, the structure of the subpixel SP shown in FIG. 7 will be described.

As in the embodiment shown in FIG. 10, the driving circuit 141 may include a digital-to-analog converter DAC to output a sensing data voltage, a black data voltage, or a display data voltage through the first data line DL1. The sensing circuit 145 may include a first voltage circuit SPRE, a second voltage circuit RPRE, a sampling circuit SAM, and an analog-to-digital converter ADC to output and sense a voltage through the first reference line VREF1.

The first voltage circuit SPRE and the second voltage circuit RPRE may perform a voltage output operation to initialize nodes or circuits included in the subpixel SP or charge the same to a specific voltage level. The first voltage circuit SPRE and the second voltage circuit RPRE may include a first reference voltage source VPRES and a second reference voltage source VPRER, respectively. The first voltage circuit SPRE may output a first reference voltage on the basis of the first reference voltage source VPRES, and the second voltage circuit RPRE may output a second reference voltage on the basis of the second reference voltage source VPRER. The first reference voltage may be set to a voltage lower than the second reference voltage.

The sampling circuit SAM can perform a sampling operation to acquire a sensing voltage through the first reference line VREF1. For example, the sampling circuit SAM may acquire the sensing voltage from a sensing capacitor PCAP formed on the first reference line VREF1 on the basis of the sensing capacitor PCAP.

The analog-to-digital converter ADC can convert the analog sensing voltage acquired by the sampling circuit SAM into a digital sensing voltage (sensing value) and output the same. For example, the analog-to-digital converter ADC can convert the analog sensing voltage charged in the sensing capacitor PCAP into a digital sensing voltage and output the same.

The timing controller 120 may include a compensator that performs a compensation operation based on the sensing voltage (sensing value) supplied from the sensing circuit 145. The compensator included in the timing controller 120 may determine whether the driving transistor DT or the organic light emitting diode OLED included in the subpixel SP has deteriorated on the basis of the sensing voltage and compensate for the deterioration.

As shown in FIG. 11, according to the first example, the light emitting display device may perform a sequential sensing method in which sensing is performed from the first gate line GL1 to the M-th gate line GLm of the display panel 150. Although FIG. 11 illustrates an example in which sensing is performed sequentially starting from the first gate line GL1, which is the top of the display panel 150, sensing may start from the M-th gate line GLm, which is the bottom of the display panel 150.

As shown in FIG. 12, according to the second example, the light emitting display device may perform a random sensing method in which only an I-th gate line GLi of the display panel 150 is sensed. Although FIG. 12 illustrates an example in which only the I-th gate line GLi, which is one of specific gate lines, is sensed, the sensing target may be two or more gate lines.

Figure 13:
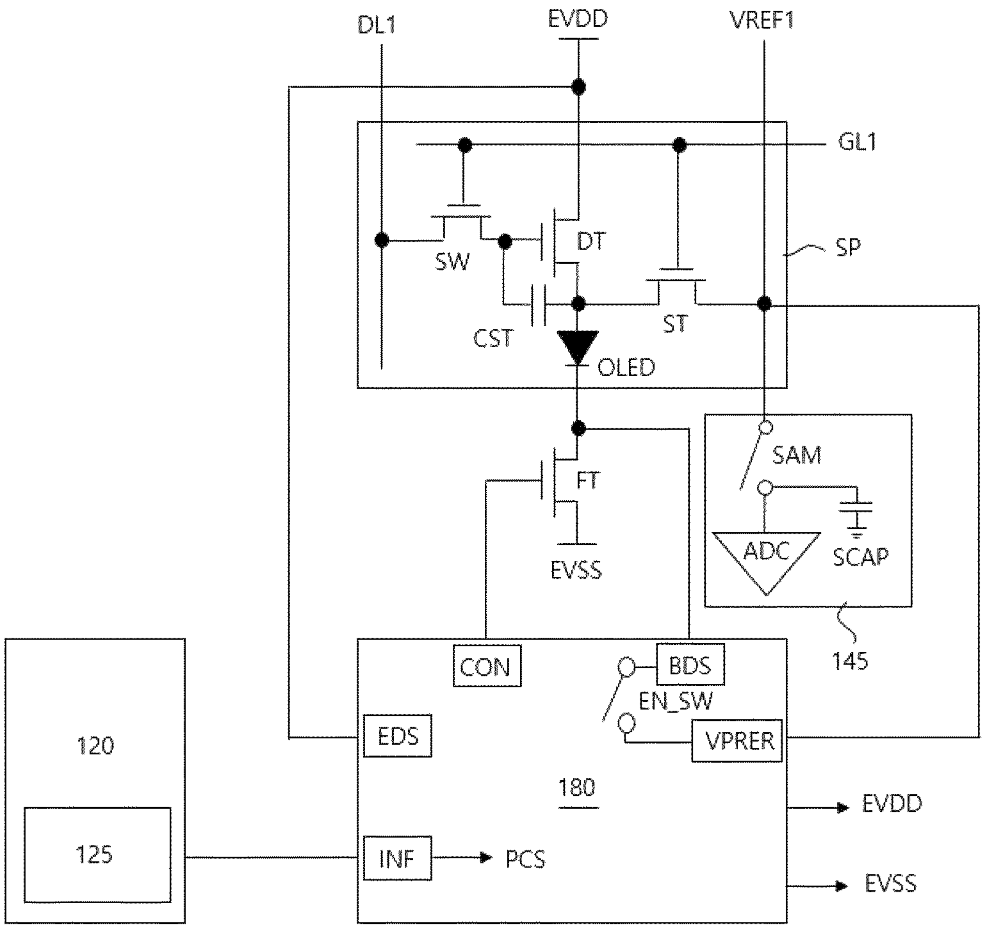
FIG. 13 is a diagram showing some components included in a light emitting display device according to a first embodiment.
Figure 14:
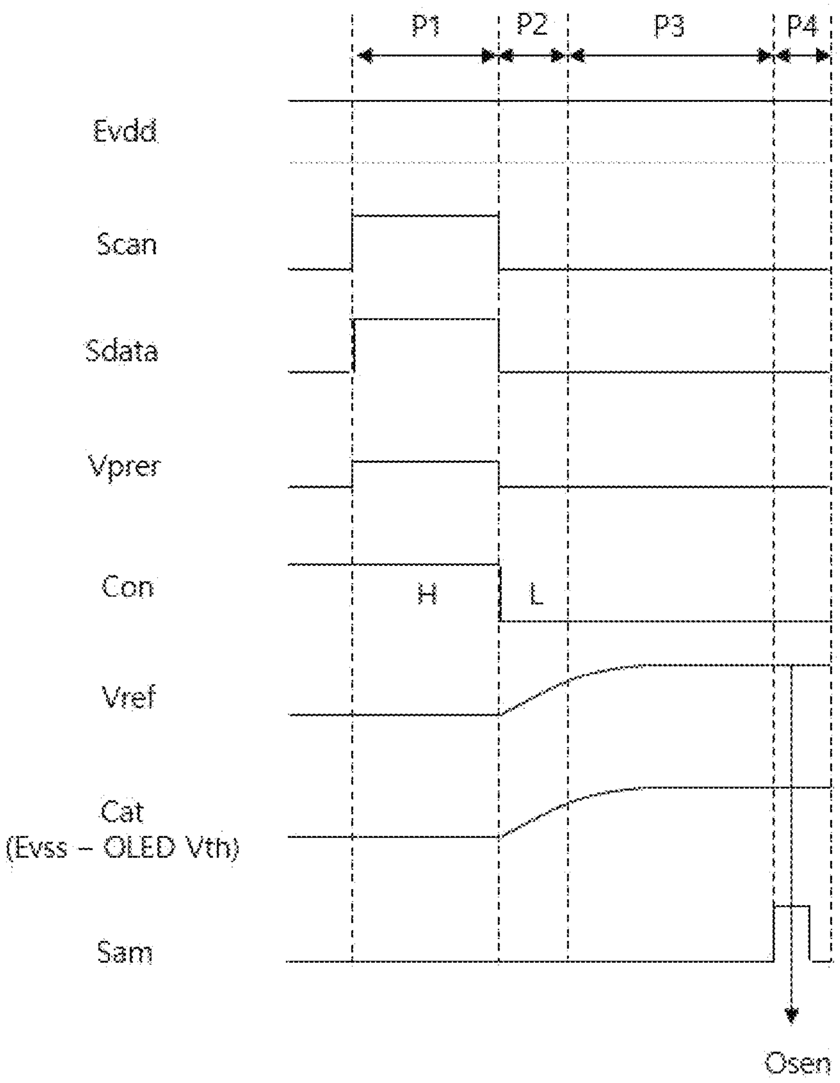
FIG. 14 is a waveform diagram illustrating a method of driving the light emitting display device according to the first embodiment.

FIG. 13 is a diagram showing some components included in a light emitting display device according to a first embodiment, FIG. 14 is a waveform diagram illustrating a method of driving the light emitting display device according to the first embodiment, and FIG. 15 to FIG. 18 are diagrams showing step-by-step operations of the device corresponding to the driving method shown in FIG. 14.

As shown in FIG. 13, the light emitting display device according to the first embodiment may sense the threshold voltage of an organic light emitting diode OLED included in a subpixel SP on the basis of the operations of the timing controller 120, the sensing circuit 145, and the power supply 180 to determine whether or not the organic light emitting diode OLED has deteriorated, and perform a compensation operation according to the deterioration.

The timing controller 120 may include a compensation circuit 125. The compensation circuit 125 may determine whether or not the organic light emitting diode OLED has deteriorated on the basis of a sensing voltage (sensing value) transmitted from the sensing circuit 145 and compensate for the deterioration. Additionally, the compensation circuit 125 may generate a power control signal PCS for controlling at least one of devices included in the power supply 180 in accordance with a sensing timing.

The power supply 180 may include a first circuit EDS, a second circuit CON, a third circuit BDS, a fourth circuit VPRER, an activation switch EN_SW, and a fifth circuit INF. The first circuit EDS may serve to sense a voltage or current flowing through the first power line EVDD. The second circuit CON may output a sensing control signal Con for turning on/off a power control transistor FT. The third circuit BDS may serve to sense a sensing node defined between the organic light emitting diode OLED and the power control transistor FT. The fourth circuit VPRER may serve to apply a second reference voltage to the first reference line VREF1 of the subpixel SP. The fifth circuit INF may serve to receive the power control signal PCS on the basis of an interface that enables communication with the timing controller 120 and to transmit the same to at least one of the internal devices. The activation switch EN_SW may be turned on or off in response to a switch control signal included in the power control signal PCS. The activation switch EN_SW may serve to activate a path through which a voltage or current can move between the third circuit BDS and the fourth circuit VPRER (provide a voltage transfer path) or disable (block the voltage transfer path) or deactivate the path (block the voltage transfer path).

As shown in FIG. 14, the light emitting display device according to the first embodiment operates in the order of a first period P1, a second period P2, a third period P3, and a fourth period P4 and can sense the threshold voltage of the organic light-emitting diode OLED. The first period P1, the second period P2, the third period P3, and the fourth period P4 are periods in which no valid image is displayed on the display panel, for example, blank periods or periods in which black is displayed on the entire display panel. However, the first embodiment is not limited thereto.

Figure 15:
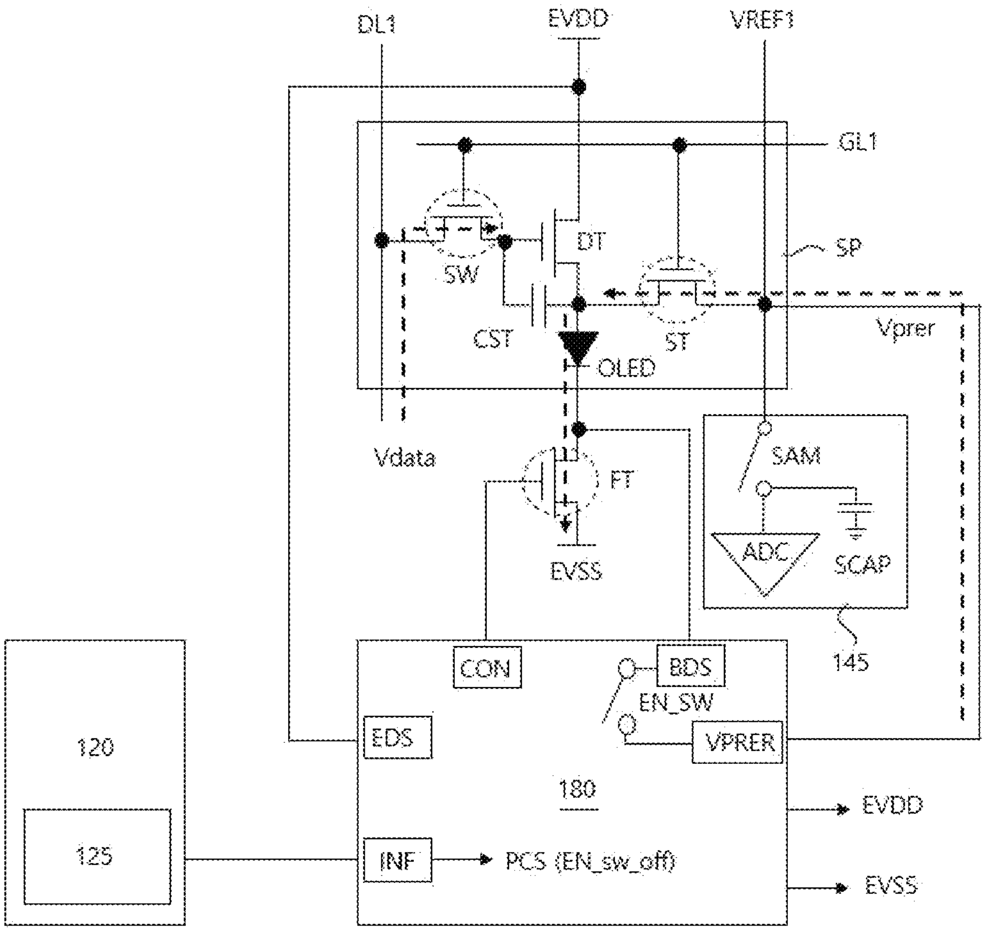
FIG. 15 to FIG. 18 are diagrams showing step-by-step operations of the device corresponding to the driving method shown in FIG. 14.

As shown in FIG. 14 and FIG. 15, a scan signal Scan of an on-voltage H may be applied to the first gate line GL1 during the first period P1. The switching transistor SW and the sensing transistor ST can be turned on during the first period P1 in response to the scan signal Scan of the on-voltage H. During the first period P1, a sensing data voltage Sdata may be applied to the first data line DL1. The capacitor (CST) can charge the sensing data voltage Sdata applied through the switching transistor SW. During the first period P1, the sensing control signal Con of the on-voltage H may be applied to the power control transistor FT. The power control transistor FT can be turned on during the first period P1 on the basis of the sensing control signal Con of the on-voltage H. During the first period P1, the activation switch EN_SW can be turned off in response to a switch off signal EN_sw_off included in the power control signal PCS. During the first period P1, the second reference voltage Vprer can be charged in the first reference line VREF1 and the subpixel SP. The subpixel SP may complete a preparation operation for sensing the threshold voltage of the organic light emitting diode OLED on the basis of the operation of the device during the first period P1.

Figure 16:
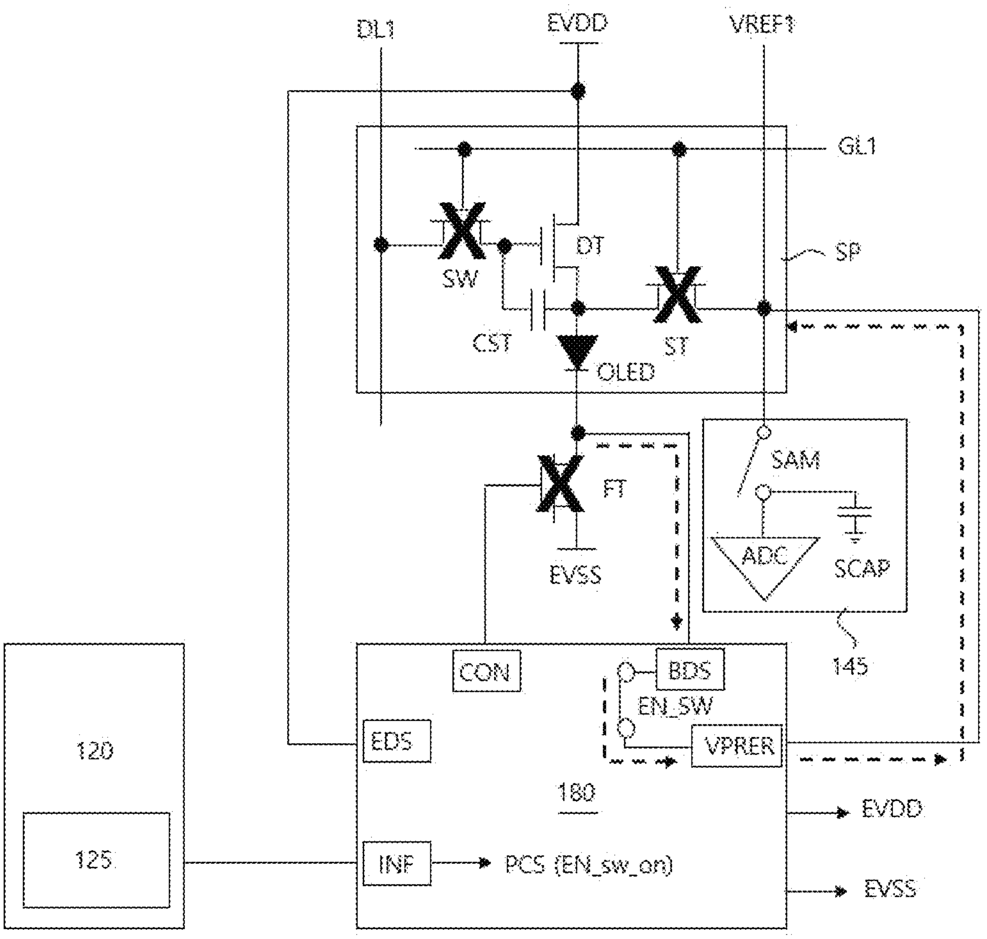

As shown in FIG. 14 and FIG. 16, a scan signal Scan of an off-voltage L may be applied to the first gate line GL1 during the second period P2. The switching transistor SW and the sensing transistor ST can be turned off in respond to the scan signal Scan of the off-voltage L, and the first data line DL1 can be in a floating state (a state in which no data voltage is applied) during the second period P2. During the second period P2, the sensing control signal Con of the off-voltage voltage L may be applied to the power control transistor FT. The power control transistor FT can be turned off during the second period P2 on the basis of the sensing control signal Con of the off-voltage L.

During the second period P2, the organic light emitting diode OLED can temporarily operate on the basis of a driving current generated from the driving transistor DT. Thereafter, a residual voltage (Evss−OLED Vth) by which the threshold voltage of the organic light emitting diode OLED can be estimated may be present between the cathode of the organic light emitting diode OLED and the power control transistor FT.

During the second period P2, the activation switch EN_SW may be turned on in response to a switch-on signal EN_sw_on included in the power control signal PCS. The residual voltage Cat (Evss−OLED Vth) present at the cathode of the subpixel SP during the second period P2 may be transmitted through the first reference line VREF1 via the third circuit BDS and the fourth circuit VPRER as the activation switch EN_SW is turned on.

Figure 17:
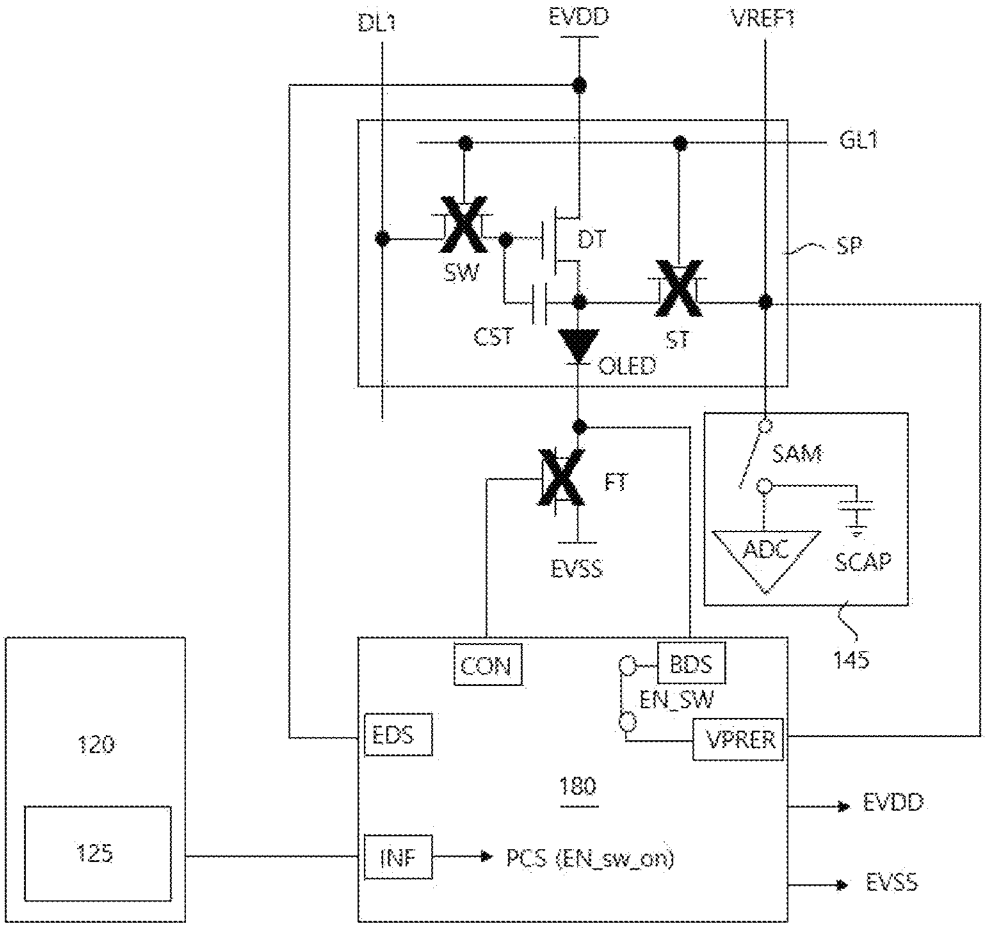

As shown in FIG. 14 and FIG. 17, the scan signal Scan of the off-voltage L may be applied to the first gate line GL1 during the third period P3. The switching transistor SW and the sensing transistor ST can be turned off during the third period P3 in response to the scan signal Scan of the off-voltage L. During the third period P3, the first data line DL1 may be in a floating state (a state in which no data voltage is applied). During the third period P3, the sensing control signal Con of the off-voltage voltage L may be applied to the power control transistor FT. The power control transistor FT can be turned off during the third period P3 in response to the sensing control signal Con of the off-voltage L. During the third period P3, the activation switch EN_SW can be turned on in response to the switch-on signal EN_sw_on included in the power control signal PCS. The remaining voltage Cat (Evss−OLED Vth) of the cathode of the subpixel SP, transmitted to the first reference line VREF1, can reach a saturation state during the third period P3.

Figure 18:
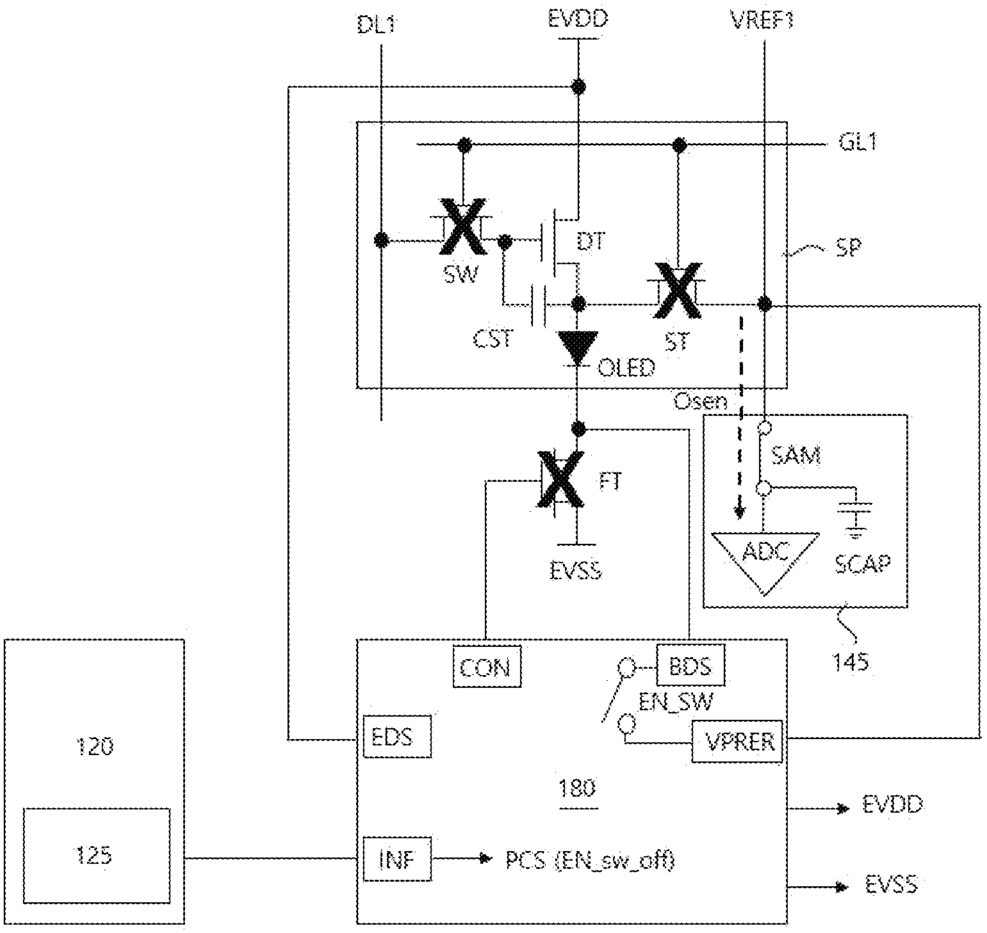

As shown in FIG. 14 and FIG. 18, the scan signal Scan of the off-voltage L may be applied to the first gate line GL1 during the fourth period P4. The switching transistor SW and the sensing transistor ST can be turned off during the fourth period P4 in response to the scan signal Scan of the off-voltage L. During the fourth period P4, the first data line DL1 can be in a floating state (a state in which no data voltage is applied). During the fourth period P4, the sensing control signal Con of the off-voltage voltage L may be applied to the power control transistor FT. The power control transistor FT can be turned off during the fourth period P4 in response to the sensing control signal Con of the off-voltage L. During the fourth period P4, the activation switch EN_SW can be turned off in response to the switch-off signal EN_sw_off included in the power control signal PCS. During the fourth period P4, the sampling circuit SAM can perform a sampling operation to acquire a sensing voltage Osen through the first reference line VREF1. The voltage Cat (Evss−OLED Vth) charged in the first reference line VREF1 during the fourth period P4 can be sampled by the sampling circuit SAM, converted into a digital sensing voltage (sensing value) Osen by the analog-to-digital converter ADC, and transmitted to the timing controller 120.

The compensation circuit 125 included in the timing controller 120 may calculate the threshold voltage of the organic light emitting diode OLED and determine whether or not the organic light emitting diode OLED has deteriorated on the basis of the sensing voltage (sensing value) Osen acquired by the sensing circuit 145 included in the data driver, and provide compensation data (compensation value) for compensating for the deterioration.

Figure 19:
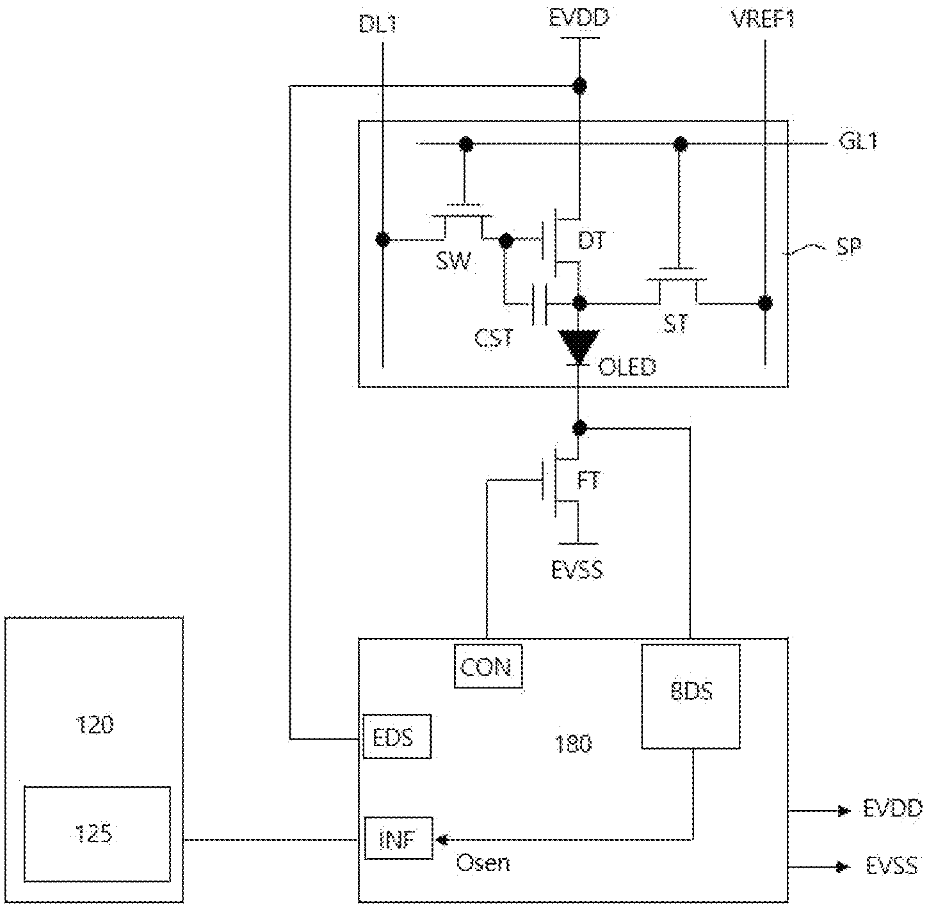
FIG. 19 is a diagram showing some components included in a light emitting display device according to a second embodiment.
Figure 20:
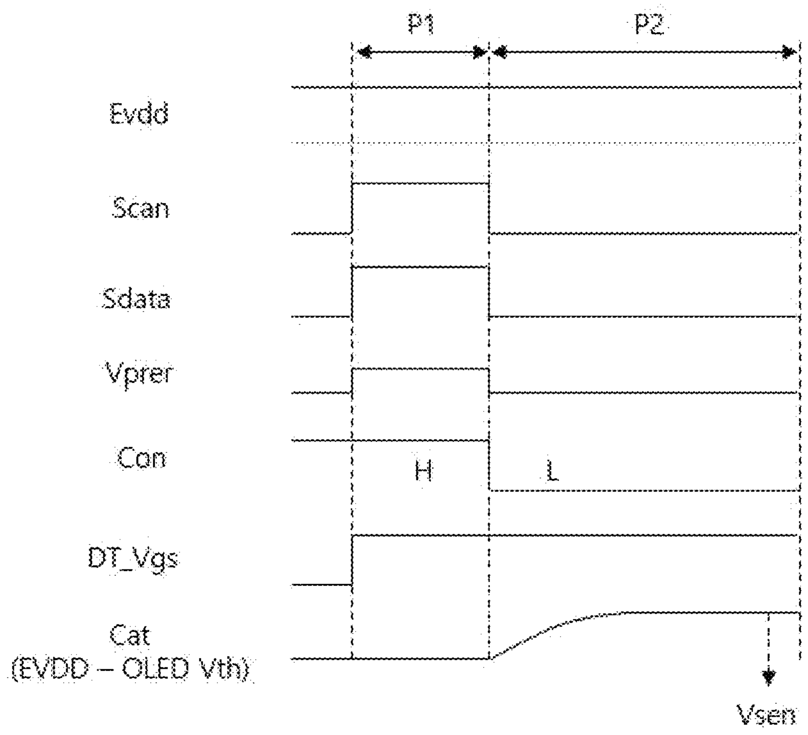
FIG. 20 is a waveform diagram illustrating a method of driving the light emitting display device according to the second embodiment.
Figure 21:
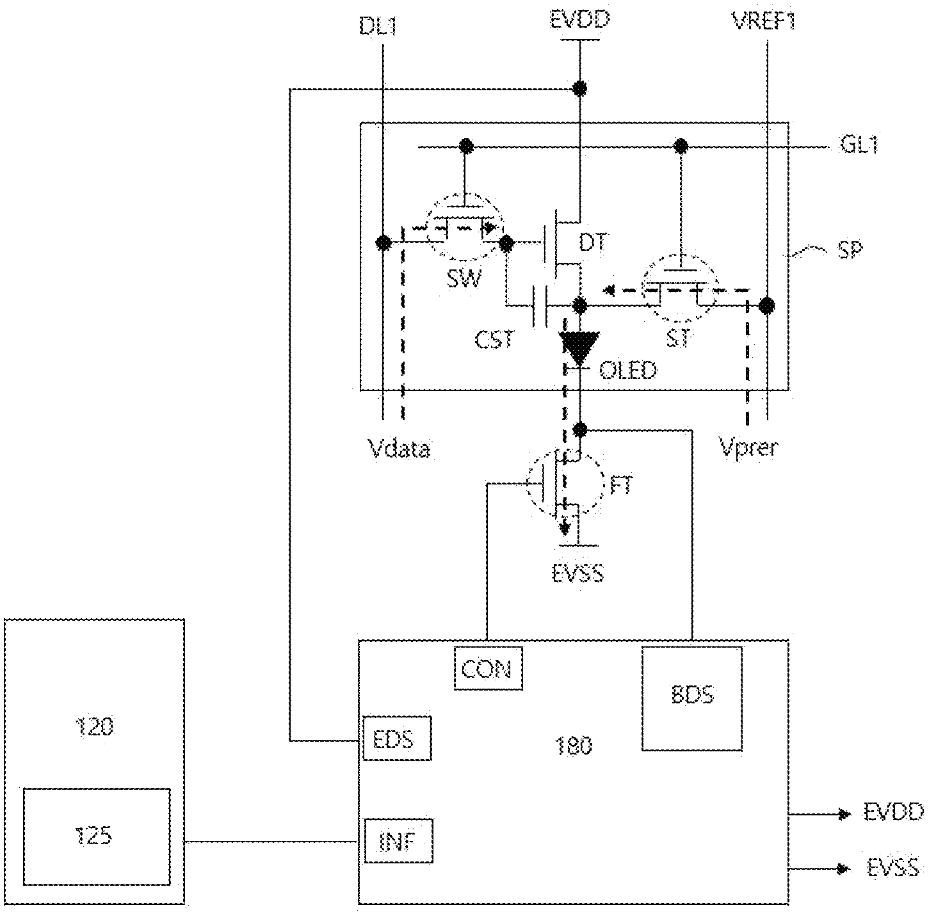
FIG. 21 and FIG. 22 are diagrams showing step-by-step operations of the device corresponding to the driving method shown in FIG. 20.
Figure 22:
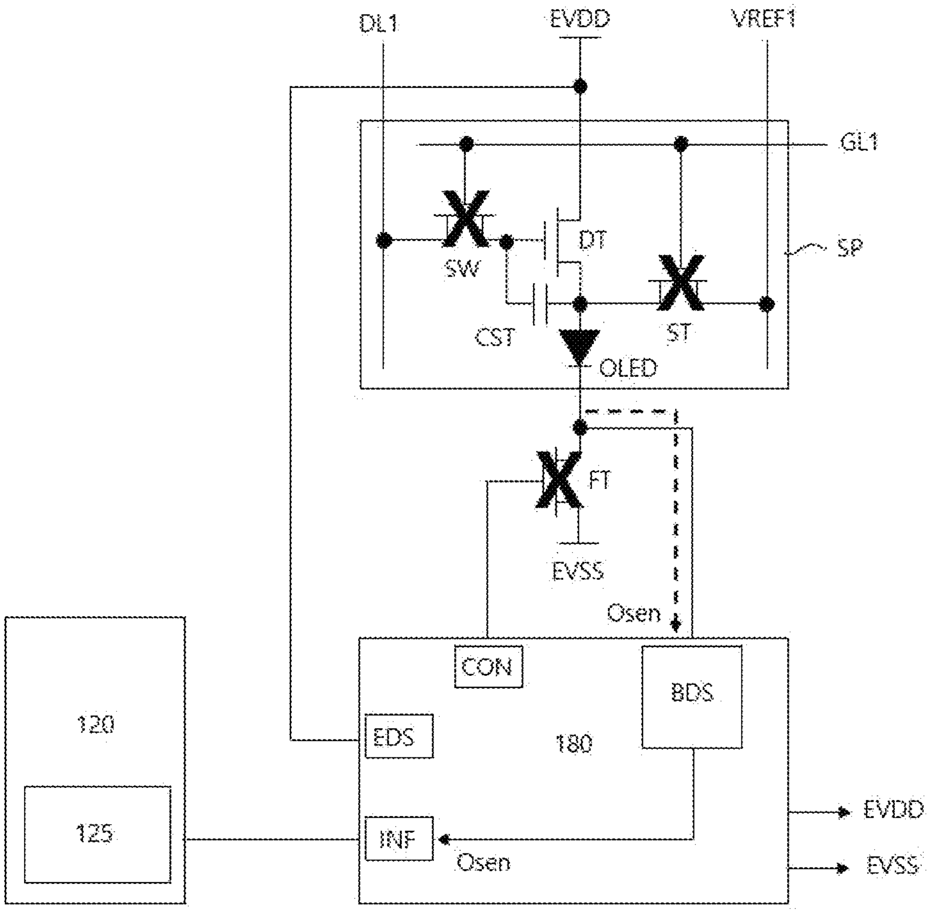

FIG. 19 is a diagram showing some components included in a light emitting display device according to a second embodiment, FIG. 20 is a waveform diagram illustrating a method of driving the light emitting display device according to the second embodiment, and FIG. 21 and FIG. 22 are diagrams showing step-by-step operations of the device corresponding to the driving method shown in FIG. 20.

As shown in FIG. 19, the light emitting display device according to the second embodiment may sense the threshold voltage of the organic light emitting diode OLED included in the subpixel SP and determine whether or not the organic light emitting diode OLED has deteriorated on the basis of the operations of the timing controller 120 and the power supply 180, and perform a compensation operation according to the deterioration.

The timing controller 120 may include the compensation circuit 125. The compensation circuit 125 may determine whether or not the organic light emitting diode OLED has deteriorated on the basis of the sensing voltage (sensing value) Osen transmitted from the power supply 180 and may compensate for the deterioration.

The power supply 180 may include a first circuit EDS, a second circuit CON, a third circuit BDS, and a fifth circuit INF. The first circuit EDS can sense a voltage or current flowing through the first power line EVDD. The second circuit CON can output a sensing control signal for turning on/off the power control transistor FT. The third circuit BDS can provide a sensing voltage Osen by sensing a node defined between the organic light emitting diode OLED and the power control transistor FT. The fifth circuit INF can serve to transmit the sensing voltage Osen to the timing controller 120 based on an interface that enables communication with the timing controller 120.

As shown in FIG. 20, the light emitting display device according to the second embodiment operates in the order of the first period P1 and the second period P2, and can sense the threshold voltage of the organic light emitting diode OLED. The first period P1 and the second period P2 may be periods in which a valid image is not displayed on the display panel, for example, blank periods or periods in which black is displayed on the entire display panel. However, the second embodiment is not limited thereto.

As shown in FIG. 20 and FIG. 21, a scan signal Scan of an on-voltage H may be applied to the first gate line GL1 during the first period P1. The switching transistor SW and the sensing transistor ST can be turned on during the first period P1 in response to the scan signal Scan of the on-voltage H. During the first period P1, a sensing data voltage Sdata may be applied to the first data line DL1. The capacitor CST can be charged by the sensing data voltage Sdata applied through the switching transistor SW. During the first period P1, a sensing control signal Con of the on-voltage H may be applied to the power control transistor FT. The power control transistor FT can be turned on during the first period P1 in response to the sensing control signal Con of the on-voltage H. During the first period P1, a second reference voltage Vprer may be charged in the first reference line VREF1 and the subpixel SP. The subpixel SP may complete a preparation operation for sensing the threshold voltage of the organic light emitting diode OLED on the basis of the operation of the device during the first period P1.

As shown in FIG. 20 and FIG. 22, a scan signal Scan of an off-voltage L may be applied to the first gate line GL1 during the second period P1. The switching transistor SW and the sensing transistor ST can be turned off during the second period P2 in response to the scan signal Scan of the off-voltage L. During the second period P2, the first data line DL1 may be in a floating state (a state in which no data voltage is applied). During the second period P2, a sensing control signal Con of the off-voltage L may be applied to the power control transistor FT. The power control transistor FT can be turned off during the second period P2 in response to the sensing control signal Con of the off-voltage L.

During the second period P2, the organic light emitting diode OLED may be temporarily driven on the basis of a driving current generated from the driving transistor DT. Thereafter, a residual voltage (Evss−OLED Vth) by which the threshold voltage of the organic light emitting diode OLED can be estimated may be present between the cathode of the organic light emitting diode OLED and the power control transistor FT. During the second period P2, the residual voltage Cat (Evss−OLED Vth) present between the cathode of the organic light emitting diode OLED and the power control transistor FT may be sampled by the third circuit BDS, converted into a digital sensing voltage (sensing value) Osen, and transmitted to the timing controller 120. To this end, the third circuit BDS may include a sampling circuit and an analog-to-digital converter.

The compensation circuit 125 included in the timing controller 120 may calculate the threshold voltage of the organic light emitting diode OLED and determine whether or not the organic light emitting diode OLED has deteriorated on the basis of the sensing voltage (sensing value) Osen acquired by the third circuit BDS included in the power supply 180, and provide compensation data (compensation value) for compensating for the deterioration. Meanwhile, the third circuit BDS included in the power supply 180 may sense the voltage or current remaining between the cathode of the organic light emitting diode OLED and the power control transistor FT, and obtain a sensing value by which the presence or absence of defects in elements or lines included in the display panel on the basis of the voltage or current.

Figure 23:
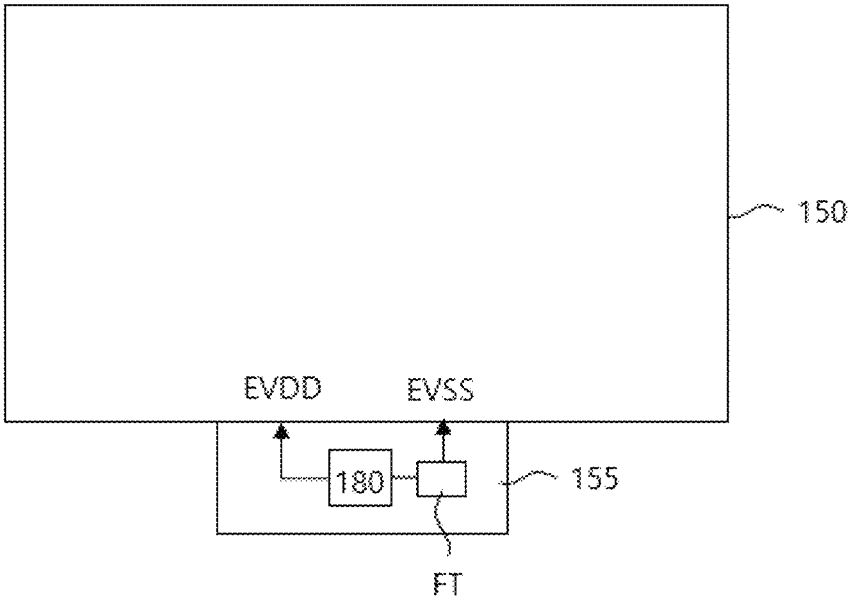
FIG. 23 is a diagram showing a position at which a power control transistor FT is disposed according to the second embodiment.
Figure 24:
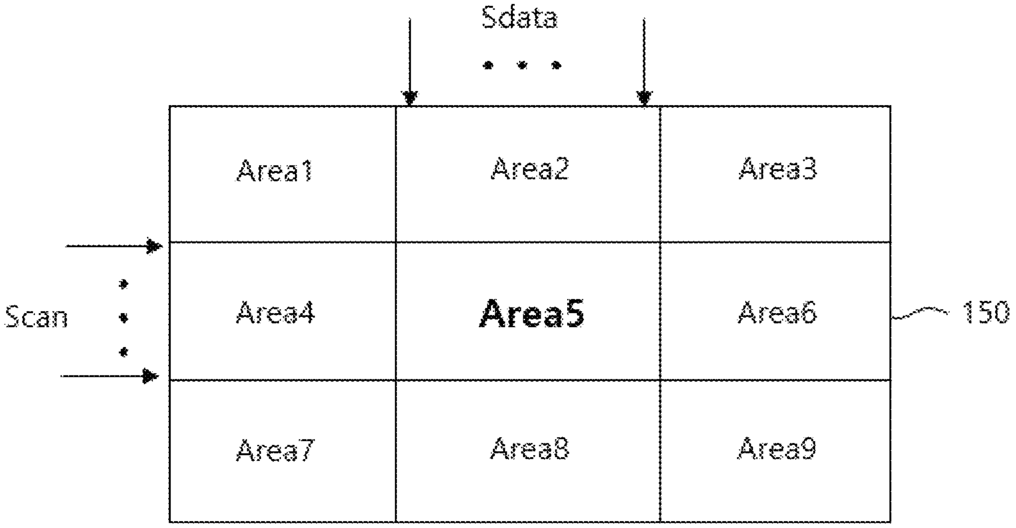
FIG. 24 is a diagram illustrating a method of dividing a display panel and sensing an area of the display panel according to the second embodiment.
Figure 25:
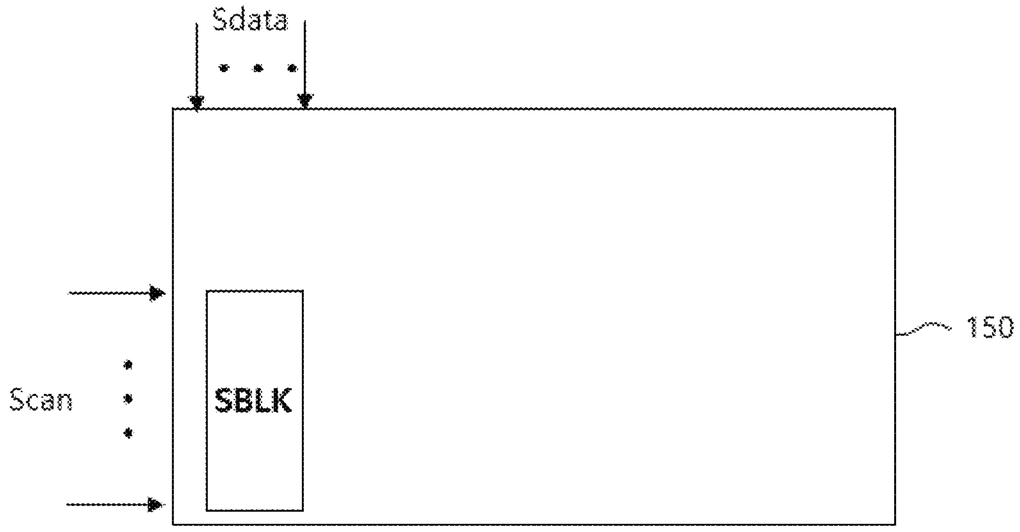
FIG. 25 is a diagram illustrating a method of designating an area of the display panel and sensing the area according to the second embodiment.

FIG. 23 is a diagram showing a position at which the power control transistor FT is disposed according to the second embodiment, FIG. 24 is a diagram illustrating a method of dividing a display panel and sensing an area of the display panel according to the second embodiment, and FIG. 25 is a diagram illustrating a method of designating an area of the display panel and sensing the area according to the second embodiment.

As shown in FIG. 23, according to the second embodiment, a first power line EVDD through which the first power is transmitted to the display panel 150 and a second power line EVSS through which the second power is transmitted to the display panel 150 may be provided on a circuit board 155. The power supply 180, which is connected to the first power line EVDD and the second power line EVSS and generates and outputs the first power and the second power, may be located on the circuit board 155.

The power control transistor FT may be located on the circuit board 155. The power control transistor FT may have a first electrode connected to the second power output terminal of the power supply 180 and a second electrode connected to the second power line EVSS. When the power control transistor FT is turned on, the second power output through the second power output terminal of the power supply 180 can be transmitted to the subpixels of the display panel 150 through the second power line EVSS. On the other hand, when the power control transistor FT is turned off, the second power output through the second power output terminal of the power supply 180 can be blocked without being transmitted to the subpixels of the display panel 150.

As shown in FIG. 24, in the second embodiment as described above, only subpixels to which the sensing data voltage Sdata and the scan signal Scan are applied can be designated as sensing target subpixels for which the threshold voltages of the organic light emitting diodes can be sensed. Therefore, the light emitting display device according to the second embodiment may adopt a method of dividing the display panel 150 into a plurality of areas, such as first to ninth areas Area1 to Area9, designating at least one of these areas as a sensing area, and sensing the designated sensing area.

As shown in FIG. 25, in the second embodiment as described above, only subpixels to which the sensing data voltage Sdata and the scan signal Scan are applied can be designated as sensing target subpixels for which the threshold voltages of the organic light emitting diodes can be sensed. Therefore, the light emitting display device according to the second embodiment may adopt a method of designating a specific part of the display panel 150 as a sensing block SBLK (or sensing area) (coordinate designation method) and sense only this block.

In the second embodiment, it is possible to sense the threshold voltages of organic light emitting diodes from one or more subpixels selected from red, green, blue, or white subpixels in the display panel and compensate for deterioration. Accordingly, sensing target subpixels can be freely selected as one subpixel, subpixels included in a block, or subpixels included in an area.

The present disclosure has the effect of sensing a threshold voltage of an organic light emitting diode from a specific subpixel to determine whether or not the organic light emitting diode has deteriorated, compensating for the deterioration to improve display quality, and achieving a long lifespan. In addition, the present disclosure has the effect of making it possible to construct a lookup table that can improve the reliability of a light emitting display device on the basis of a sensing technique by which a correct degree of deterioration can be ascertained for each color of a subpixel.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:
- a subpixel including a light emitting element;
- a reference line connected to the subpixel;
- a power supply configured to provide a path for transmitting a voltage present at a cathode of the light emitting element to the reference line; and
- a sensing circuit configured to sense a voltage present on the reference line,
- wherein the power supply includes a power control transistor for blocking low-voltage power applied to the cathode of the light emitting element when the voltage present at the cathode of the light emitting element is transmitted to the reference line.

2. The display device of claim 1, wherein the power supply includes an activation switch configured to be turned on when the voltage at the cathode of the light emitting element is transmitted to the reference line.

3. The display device of claim 2, wherein the power control transistor is disposed between an output terminal of the power supply and a low-voltage power line of the display panel, and the activation switch is included in the power supply and disposed between a circuit connected to the cathode of the light emitting element and a circuit connected to the reference line.

4. A method of driving a display device, comprising:
- a first step of applying a scan signal of an on-voltage to a gate line of a subpixel included in a display panel, applying a sensing data voltage to a data line of the subpixel, applying a reference voltage to a reference line of the subpixel, and applying power to a power line of the subpixel;
- a second step of applying a scan signal of an off-voltage to the gate line of the subpixel, floating the data line of the subpixel, blocking the reference voltage applied to the reference line of the subpixel, blocking, by a power control transistor included in a power supply, a low-voltage power applied to a power line connected to a cathode of the subpixel, and transmitting a voltage present at the cathode of the subpixel to the reference line of the subpixel; and
- a third step of generating a compensation value according to whether or not the light emitting element has deteriorated by sensing the voltage transmitted to the reference line of the subpixel.

5. The method of claim 4, wherein the first step comprises selectively outputting a scan signal applied to a gate line of the display panel and a sensing data voltage applied to a data line of the display panel to enable sensing for each area or block of the display panel.

6. A display device comprising:
- a subpixel including a light emitting element;
- a reference line connected to the subpixel;
- a power supply configured to sense a voltage at a cathode of the light emitting element and providing a sensing value; and
- a controller configured to generate a compensation value based on whether or not the light emitting element has deteriorated on the basis of the sensing value transmitted from the power supply,
- wherein the power supply includes a power control transistor for blocking low-voltage power applied to the cathode of the light emitting element when sensing the voltage at the cathode of the light emitting element.

7. The display device of claim 6, wherein the power control transistor is disposed between an output terminal of the power supply and a low-voltage power line of the display panel.

8. A method of driving a display device, comprising:
- a first step of applying a scan signal of an on-voltage to a gate line of a subpixel included in a display panel, applying a sensing data voltage to a data line of the subpixel, applying a reference voltage to a reference line of the subpixel, and applying power to a power line of the subpixel;
- a second step of applying a scan signal of an off-voltage to the gate line of the subpixel, floating the data line of the subpixel, blocking the reference voltage applied to the reference line of the subpixel, blocking, by a power control transistor included in a power supply, a low-voltage power applied to a power line connected to a cathode of the subpixel, and sensing a voltage present at the cathode of the subpixel using a circuit included in a power supply; and a third step of generating a compensation value according to whether or not the light emitting element has deteriorated on the basis of the voltage transmitted from the circuit included in the power supply.

9. The method of claim 8, wherein the first step comprises selectively outputting a scan signal applied to a gate line of the display panel and a sensing data voltage applied to a data line of the display panel to enable sensing for each area or block of the display panel.

* * * * *